US012775818B2

(12) United States Patent
Gerber et al.

(10) Patent No.: US 12,775,818 B2
(45) Date of Patent: Oct. 27, 2026

(54) MEASURING DEVICE

(71) Applicant: Kistler Holding AG, Winterthur (CH)

(72) Inventors: Christian Gerber, Seuzach (CH); Mathieu Glardon, Ossingen (CH)

(73) Assignee: Kistler Holding AG, Winterthur (CH)

( * ) Notice: Subject to any disclaimer, the term of this patent is extended or adjusted under 35 U.S.C. 154(b) by 357 days.

(21) Appl. No.: 18/529,245

(22) Filed: Dec. 5, 2023

(65) Prior Publication Data

US 2024/0242052 A1 Jul. 18, 2024

(30) Foreign Application Priority Data

Jan. 12, 2023 (EP) .................................... 23151270

(51) Int. Cl.

| | |
|---|---|
| ***G06K 19/07*** | (2006.01) |
| ***G01D 5/16*** | (2006.01) |
| ***G01D 5/24*** | (2006.01) |
| ***G01D 11/00*** | (2006.01) |
| ***G01D 11/24*** | (2006.01) |
| ***G06K 19/073*** | (2006.01) |
| ***G06K 19/077*** | (2006.01) |

(52) U.S. Cl.
CPC ....... *G06K 19/0717* (2013.01); *G06K 19/073* (2013.01); *G06K 19/07756* (2013.01)

(58) Field of Classification Search
CPC .................................................. G06K 19/0717
See application file for complete search history.

(56) References Cited

U.S. PATENT DOCUMENTS

2009/0278685 A1* 11/2009 Potyrailo ............. G01N 27/126 340/572.1
2011/0012736 A1* 1/2011 Potyrailo ........... G06K 19/0717 340/572.1
2011/0101996 A1* 5/2011 Potyrailo ............... G01D 21/00 324/655
2014/0152425 A1 6/2014 Valentine et al.
2014/0210631 A1* 7/2014 Zavis .................. H01R 13/641 340/815.45
2016/0356635 A1* 12/2016 Usami .................... G01D 18/00
2021/0334486 A1* 10/2021 De Oliveira ....... G06K 19/0723

FOREIGN PATENT DOCUMENTS

DE 10 2015 106322 A1 10/2016
WO WO 2016/210360 A1 12/2016

OTHER PUBLICATIONS

EPO Search Report with Translation, Jun. 19, 2023, 11 pages.

* cited by examiner

*Primary Examiner* — Davetta W Goins
*Assistant Examiner* — Pameshanand Mahase
(74) *Attorney, Agent, or Firm* — Dority & Manning, P.A.

(57) ABSTRACT

A measuring device for measuring a physical quantity includes a sensor arrangement connected by a signal conductor to an amplifier arrangement. The sensor arrangement generates a measurement signal and includes an RFID transponder. The amplifier arrangement includes an RFID write and read device that is capacitively coupled to the RFID transponder. Data for transmission via the signal conductor are modulated onto high-frequency electrical signals.

10 Claims, 4 Drawing Sheets

MEASURING DEVICE

FIELD OF THE INVENTION

The invention relates to a measuring device for measuring a physical quantity with a sensor arrangement, which includes a Transducer Electronic Data Sheet and a radio frequency identification (RFID) transponder, and an amplifier arrangement that includes an RFID write and read device.

BACKGROUND OF THE INVENTION

Such a measuring arrangement is widely used in measurement technology for measuring a physical quantity such as a pressure, a force, a moment, an acceleration, a temperature, and so on.

To this end, the document WO2016/210360A1, which corresponds to US Patent Application Publication No. 2017-0097249, which is hereby incorporated in its entirety herein for all purposes, discloses a measuring arrangement for measuring an acceleration or force. As an exemplary embodiment, an Integral Electronic Piezo Electric (IEPE) is described, in which an amplifier arrangement is connected downstream of a sensor arrangement with a piezoelectric sensor element (PE sensor element). For the acceleration or force to be measured, the PE sensor element generates polarization charges which are amplified by the amplifier arrangement into an electrical voltage. The electrical voltage is transmitted as a measured value to an evaluation arrangement. The measured value is evaluated by the evaluation arrangement.

The measuring arrangement of WO2016/210360A1 comprises a Transducer Electronic Data Sheet (TEDS) in which sensor-specific data of the sensor arrangement such as a serial number, a type designation, data on sensitivity, calibration data, etc. are stored. The TEDS is standardized in the IEEE 1451 standard and can be described or read out by the evaluation system. Reading out sensor-specific data from the TEDS relieves the user from manually entering said data into the evaluation system and also helps the user to identify the individual measurement systems in a spatially unambiguous manner in the case of a large number of measuring arrangements. The TEDS reduces the number of possible sources of error during the measurement process and increases the accuracy of the measured value.

The measuring arrangement of WO2016/210360A1 uses a two-wire cable, because both the measuring arrangement and the TEDS require a cable with at least two electrical conductors to supply electrical power to the IEPE, to transmit the measured value, and to write to or read from the TEDS.

The disadvantage of using a two-wire cable is that the measurement process itself and the writing or reading of the TEDS cannot take place simultaneously, because the measured value is a time-varying electrical voltage which is superimposed on the positive electrical power supply of the IEPE, while the TEDS is written or read with negative electrical voltage levels. To avoid a disturbance of the measurement process when writing or reading the TEDS, WO2016/210360A1 then also separates the positive electrical power supply of the IEPE and the negative electrical voltage levels writing or reading the TEDS from each other via diodes due to their different polarity.

WO2016/210360A1 teaches the use of a radio frequency identification (RFID) transponder in the measuring device, which RFID transponder is in radio communication with a write and read device via near-field communication. The RFID transponder is electrically connected to the TEDS via a microprocessor. This means that a user can write and read to the TEDS independently of the two-wire cable via near-field communication.

OBJECTS AND SUMMARY OF THE INVENTION

It is an object of the present invention to provide a measuring arrangement that has a data memory device that is improved over a TEDS.

Said object is solved by the features described below.

The invention relates to a measuring device for measuring a physical quantity, which comprises a sensor arrangement and an amplifier arrangement. The sensor arrangement is configured to generate a measurement signal under the effect of the physical quantity to be measured, which measurement signal is transmitted via at least one signal conductor to the amplifier arrangement, which is configured to amplify the measurement signal and accordingly generate a measured value that corresponds to the physical quantity. The sensor arrangement comprises an RFID transponder in which data are permanently stored. The amplifier arrangement comprises an RFID write and read device which is configured to write data to the RFID transponder via the signal conductor and to read data from the RFID transponder. The RFID transponder is capacitively coupled to the RFID write and read device via the signal conductor. High-frequency electrical signals are generated by an electrical generator circuit and fed into the signal conductor. The electrical generator circuit is configured to modulate data onto the high-frequency electrical signals for transmission via the signal conductor.

The applicant has found that the RFID transponder in the sensor arrangement can be capacitively coupled to the RFID write and read device in the amplifier arrangement via said signal conductor. The capacitive coupling is achieved by means of high-frequency electrical signals. High-frequency electrical signals are electrical signals with a frequency greater than/equal to 9 kHz. Thus, the RFID write and read device can write data to and read data from the RFID transponder. The data remain permanently stored in the RFID transponder, where the adjective “permanently” has the meaning of “over the time period of the lifetime of the measuring device”. The RFID transponder is thus an adequate replacement for the TEDS.

Compared with a TEDS, the RFID transponder has several advantages. Thus, depending on the supplier, the RFID transponder is two to four times less expensive to purchase than a TEDS. And despite the lower purchase price, the RFID transponder currently exhibits a storage capacity which is a factor of eight greater than that of a TEDS.

Further, due to the capacitive coupling, the RFID transponder does not require an antenna for near-field communication with the RFID write and read device, which further reduces the acquisition costs.

Advantageous embodiments of the measuring device are set forth in the dependent claims.

BRIEF DESCRIPTION OF THE DRAWINGS

In the following, the invention is explained in more detail by way of example with reference to the drawings, in which.

In the figures, identical reference numerals denote identical objects.

DETAILED DESCRIPTION OF EXEMPLARY EMBODIMENTS OF THE INVENTION

Figure 1:
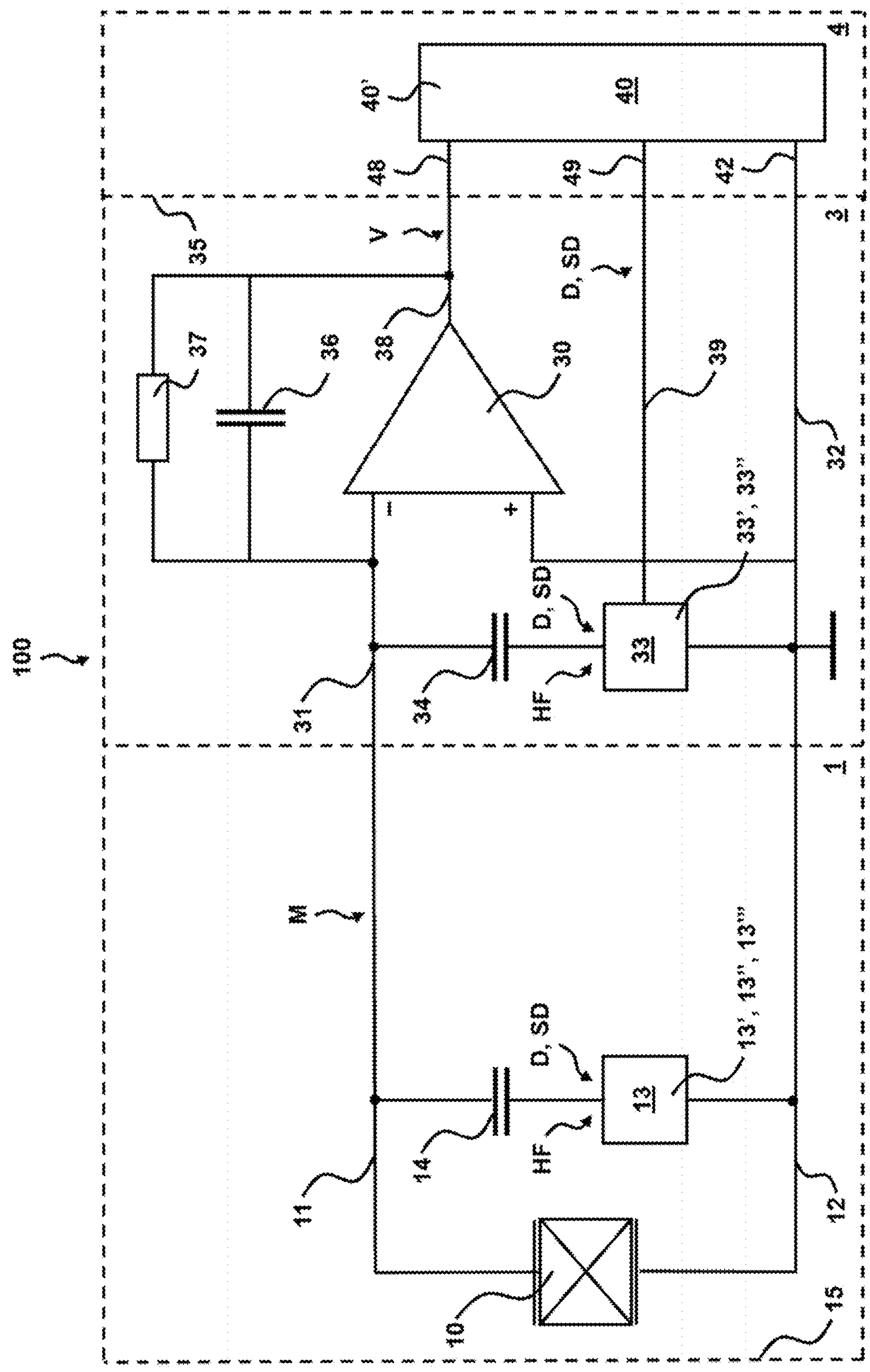
FIG. 1 shows a schematic representation of a first embodiment of a measuring device 100 comprising a sensor arrangement 1, which comprises a PE sensor element 10 and is directly electrically connected to an amplifier arrangement 3.

The measuring arrangement is generally designated by the number 100 in FIGS. 1-4 and is used to measure a physical quantity such as a pressure, a force, a moment, an acceleration, a temperature, etc.

According to the four embodiments of FIGS. 1 to 4, the measuring device 100 comprises as components a sensor arrangement 1, an amplifier arrangement 3 and an evaluation arrangement 4. According to the two embodiments of FIGS. 2 and 4, the measuring device 100 further comprises a cable arrangement 2.

The components of the measuring arrangement 100 may be globally arranged in one location or in multiple locations. Furthermore, the components of the measuring arrangement 100 may be located in a single housing or in multiple housings.

The Sensor Arrangement

The sensor arrangement 1 has the function of generating a measurement signal M for the physical quantity to be measured. The sensor arrangement 1 comprises a sensor housing 15. The sensor housing 15 is schematically shown as a dashed rectangle. The objects within the sensor housing 15 are part of the sensor arrangement 1. The sensor housing 15 is made of mechanically resistant material such as steel, etc. The sensor housing 15 can be composed of material that is electrically conductive or material that is electrically insulating.

Figure 2:
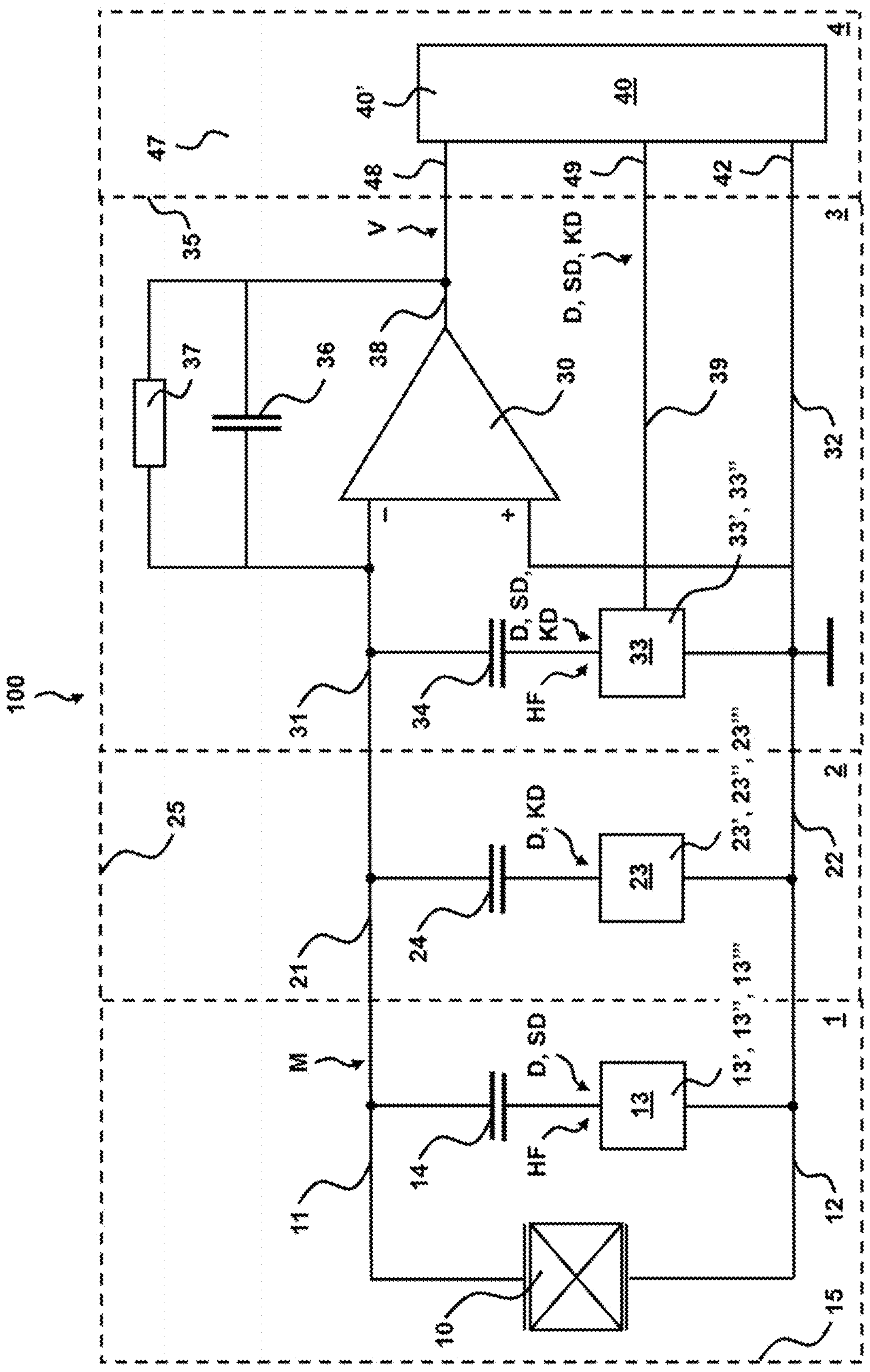
FIG. 2 shows a schematic representation of a second embodiment of a measuring device 100 comprising a sensor arrangement 1, which comprises a PE sensor element 10 and a cable arrangement 2 electrically connecting the sensor arrangement 1 to an amplifier arrangement 3.

According to the two embodiments of FIGS. 1 and 2, the sensor arrangement 1 comprises a PE sensor element 10 that comprises piezoelectric (PE) material such as quartz, gallium orthophosphate, etc., which generates polarization charges under the action of the physical quantity to be measured. Typically, the PE sensor element 10 has a sensitivity of several $pCN^{-1}$. Said PE sensor element 10 comprises electrodes made of electrically conductive material such as copper, gold, etc., which tap the polarization charges from surfaces of the PE material. The number of polarization charges is proportional to the magnitude of the physical quantity. These polarization charges are the measurement signal M of the sensor arrangement 1.

Figure 3:
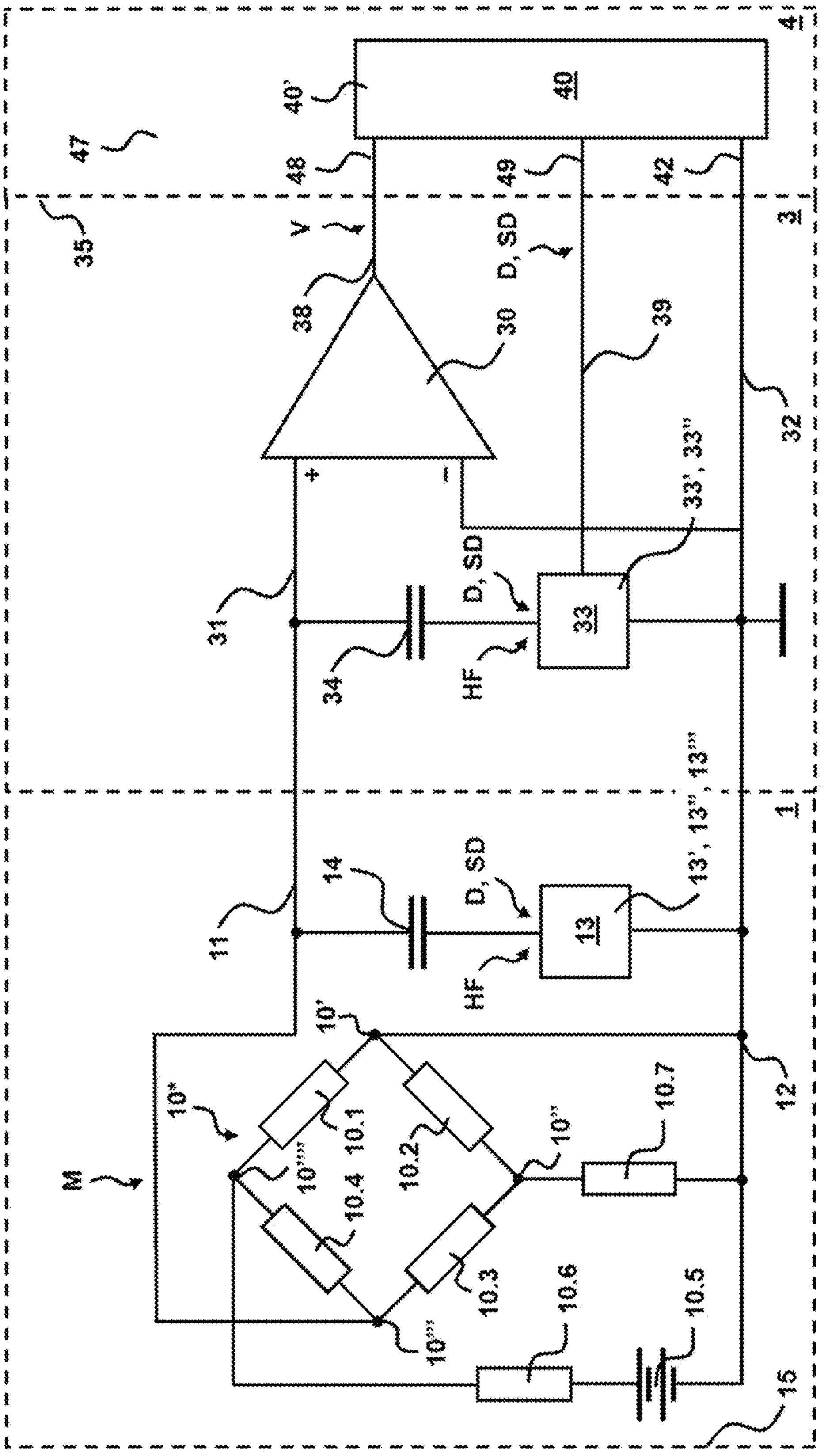
FIG. 3 shows a schematic representation of a third embodiment of a measuring device 100 comprising a sensor arrangement 1, which comprises a DMS circuit unit 10* and is electrically connected directly to an amplifier arrangement 3.
Figure 4:
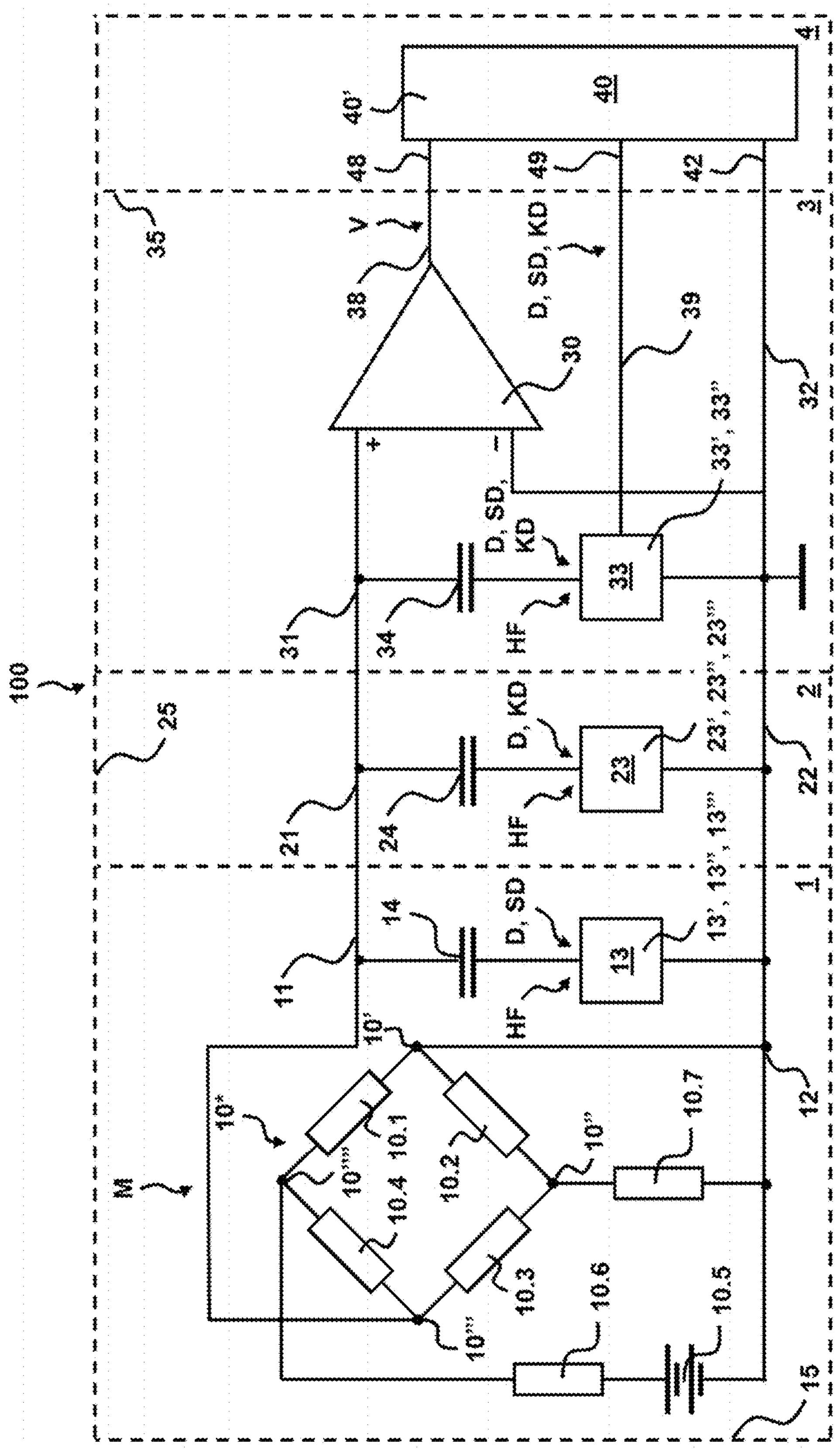
FIG. 4 shows a schematic representation of a fourth embodiment of a measuring device 100 comprising a sensor arrangement 1, which comprises a DMS circuit unit 10*, and a cable arrangement 2 electrically connecting the sensor arrangement to an amplifier arrangement 3.

According to the two embodiments of FIGS. 3 and 4, the sensor arrangement 1 comprises a circuit unit 10* with strain gauges (DMS). Said DMS circuit unit 10* can be a full bridge, half bridge or quarter bridge. In the two embodiments according to FIGS. 3 and 4, the DMS circuit unit 10* is a full bridge with a first DMS 10.1, a second DMS 10.2, a third DMS 10.3 and a fourth DMS 10.4. The first DMS 10.1 and the second DMS 10.2 are electrically connected via a first node 10'. The second DMS 10.2 and the third DMS 10.3 are electrically connected via a second node 10". The third DMS 10.3 and the fourth DMS 10.4 are electrically connected via a third node 10'". And the fourth DMS 10.4 and the first DMS 10.1 are electrically connected via a fourth node 10"". The sensor arrangement 1 comprises a DMS voltage supply unit 10.5 that applies a DC electrical voltage to the second and fourth nodes 10", 10"". The sensor arrangement 1 may comprise a first DMS compensation resistor 10.6 and a second DMS compensation resistor 10.7, which first DMS compensation resistor 10.6 is electrically connected to the fourth node 10"" and which second DMS compensation resistor 10.6 is electrically connected to the second node 10". The physical quantity to be measured stretches the DMS circuit unit 10*, thereby changing an electrical resistance of the DMS circuit unit 10*. This electrical voltage can be tapped between the first and third nodes 10', 10" and forms the measurement signal M of the sensor arrangement 1.

The sensor arrangement 1 comprises a first signal conductor 11 and a first ground conductor 12. The first signal conductor 11 and the first ground conductor 12 are made of electrically conductive material such as copper, steel, etc. The first signal conductor 11 conducts the measurement signal M within the sensor housing 15. For transmitting the measurement signal M with as little loss as possible, the first signal conductor 11 is electrically insulated with high impedance. Preferably, the electrical insulation resistance of the first signal conductor 11 at 25° C. is greater than $10^{13}\Omega$. The first ground conductor 12 is at the electrical reference potential of the measuring device 100. As a rule, the electrical reference potential is an electrical voltage of 0V.

The sensor arrangement 1 comprises an RFID transponder 13. As schematically shown in FIGS. 1-4, the RFID transponder 13 is electrically connected to the first signal conductor 11 and to the first ground conductor 12. The RFID transponder 13 comprises a data memory 13'. Currently, the data memory 13' may have a storage capacity of 8 kByte. However, technical development is moving towards larger storage capacities, so that the storage capacity will be a multiple of 8 kByte in some years.

In the data memory 13' of the RFID transponder 13, data D are permanently stored as sensor-specific data SD of the sensor arrangement 1. The sensor-specific data SD comprise at least one of the following data elements:

- a data element concerning the serial number of the sensor arrangement 1;
- a data element concerning the type designation of the sensor arrangement 1;
- a data element concerning at least one measuring range in which the sensor arrangement 1 measures the physical quantity;
- a data element concerning the sensitivity with which the sensor arrangement 1 measures the physical quantity in the at least one measuring range;
- a data element concerning the linearity deviation including the hysteresis with which the sensor arrangement 1 measures the physical quantity; and a data element concerning calibrating the sensor arrangement 1, where for the at least one measuring range the smallest measurement inaccuracy prevailing there is documented.

The RFID transponder 13 comprises an energy storage 13" that can store high-frequency electrical signals HF as electrical energy. The energy storage device 13" is electrically connected to the first signal conductor 11. High-frequency electrical signals HF, which are fed into the first signal conductor 11, can capacitively couple into the energy store 13". In the uncharged state, the energy storage 13" represents a medium-high impedance load with an electrical insulation resistance at 25° C. of less than $10^{10}\Omega$. The energy storage 13" can be a capacitor circuit.

The sensor arrangement 1 comprises a sensor coupling capacitance 14 through which the RFID transponder 13 is capacitively coupled to the first signal conductor 11.

According to the two embodiments of FIGS. 1 and 2, the measurement signal M of the first signal conductor 11 consists of polarization charges. The sensor coupling capacitance 14 prevents polarization charges from flowing from the high-impedance first signal conductor 11 to the medium-high impedance energy sensor 13".

According to the two embodiments of FIGS. 3 and 4, the measurement signal M of the first signal conductor 11 comprises an electrical voltage. The sensor coupling capacitance 14 prevents loss of the electrical voltage. The coupling capacitance 14 prevents the flow of an electrical current from the high-impedance first signal conductor 11 to the medium-high impedance energy storage device 13".

The Cable Arrangement

The cable arrangement 2 has the function of transmitting the measurement signal M to the amplifier arrangement 3. The cable arrangement 2 comprises a cable sheath 25. Said cable sheath 25 is schematically shown in FIGS. 2 and 4 as a dashed rectangle that envelops the cable arrangement 2. The objects within the envelope of the cable sheath 25 are part of the cable arrangement 2. The cable arrangement 2 can have a length of up to 100 m.

The cable arrangement 2 comprises a second signal conductor 21 and a second ground conductor 22. The second signal conductor 21 and the second ground conductor 22 are made of electrically conductive material such as copper, steel, etc.

The second signal conductor 21 can be electrically connected to the first signal conductor 11 via a connecting means not shown in the figure, such as a bushing, a plug, etc., and conducts the measurement signal M in the cable arrangement 2. The second ground conductor 22 can also be electrically connected to the first ground conductor 12 via a connecting means not shown in the figure, such as a terminal, a plug, etc.

For transmitting the measurement signal M with as little loss as possible, the second signal conductor 21 is electrically insulated with high impedance. Preferably, the electrical insulation resistance of the second signal conductor 21 at 25° C. is greater than $10^{13}\Omega$. The second ground conductor 22 is connected to the electrical reference potential of the measuring device 100. As a rule, the electrical reference potential is an electrical voltage of 0V.

The cable arrangement 2 is a two-wire cable. Preferably, the cable arrangement 2 is designed as a coaxial cable, with the second signal conductor 21 as an inner conductor and with the second ground conductor 22 as an outer conductor, which outer conductor concentrically surrounds the inner conductor. Said inner conductor is electrically insulated from the outer conductor with high impedance. The impedance of the coaxial cable is 50 Ω.

As schematically shown in FIGS. 2 and 4, the cable arrangement 2 comprises an additional RFID transponder 23. The additional RFID transponder 23 is electrically connected to the second signal conductor 21 and to the second ground conductor 22. The additional RFID transponder 23 comprises an additional data memory 23'. Currently, the additional data memory 23' can have a memory capacity of 8 kByte. However, technical development is moving towards larger memory capacities, so that in a few years the memory capacity will be a multiple of 8 kByte.

In the additional data memory 23' of the additional RFID transponder 23, data D is permanently stored as cable-specific data KD of the cable arrangement 2. The cable-specific data KD comprise at least one of the following data elements:

a data element concerning the length of the cable arrangement 2;

a data element concerning the capacitance of the cable arrangement 2;

a data element concerning the type of the cable arrangement 2; and a data element concerning the connection type of the cable arrangement 2.

The additional RFID transponder 23 comprises an additional energy storage 23", which can store high-frequency electrical signals HF as electrical energy. The additional energy storage 23" is electrically connected to the second signal conductor 21. High-frequency HF electrical signals fed into the second signal conductor 21 can couple capacitively into the additional energy store 23". In the uncharged state, the additional energy storage 23" represents a medium-high-impedance load with an electrical insulation resistance at 25° C. of less than $10^{10}\Omega$. The additional energy store 23" can be a capacitor circuit.

The cable arrangement 2 comprises a cable coupling capacitance 24 through which the additional RFID transponder 23 is capacitively coupled to the second signal conductor 21.

According to the embodiment of FIG. 2, the measurement signal M of the second signal conductor 21 comprises polarization charges. The cable coupling capacitance 24 prevents polarization charges from flowing from the high-impedance second signal conductor 21 to the medium-high impedance additional energy store 23".

According to the embodiment of FIG. 4, the measurement signal M of the second signal conductor 21 comprises an electric voltage. The cable coupling capacitance 24 prevents a loss of the electrical voltage. The cable coupling capacitance 24 prevents the flow of an electrical current from the high-impedance second signal conductor 21 to the medium-high impedance additional energy storage device 23".

The Amplifier Arrangement

The amplifier arrangement 3 has the function of amplifying the measurement signal M to a measured value V that is indicative of the physical quantity being measured. The amplifier arrangement 3 comprises an amplifier housing 35. The amplifier housing 35 is schematically shown as a dashed rectangle that envelops the amplifier arrangement 3. The objects within the amplifier housing 35 are part of the amplifier arrangement 3. The amplifier housing 35 is made of mechanically resistant material such as steel, etc. The amplifier housing 35 can be composed of material that is electrically conductive or material that is electrically insulating.

The amplifier arrangement 3 comprises a third signal conductor 31 and a third ground conductor 32. The third signal conductor 31 and the third ground conductor 32 are made of electrically conductive material such as copper, steel, etc.

According to the two embodiments of FIGS. 1 and 3, the third signal conductor 31 is electrically connected to the first signal conductor 11. According to the two embodiments of FIGS. 2 and 4, the third signal conductor 31 is electrically connected to the second signal conductor 21. The third signal conductor 31 can be electrically connected to the first signal conductor 11 or the second signal conductor 21 via a connecting means not shown in the figure, such as a bushing, a plug, etc., and transmits the measurement signal M within the amplifier housing 35. The first signal conductor 11, second signal conductor 21 and third signal conductor 31 are also simply called signal conductors 11, 21, 31. The third ground conductor 32 can also be electrically connected to the first ground conductor 12 or to the second ground conductor 22 via a connecting means not shown in the figure, such as a terminal, a plug, etc.

For transmitting the measurement signal M with as little loss as possible, the third signal conductor 31 is electrically insulated with high impedance. Preferably, the electrical insulation resistance of the third signal conductor 31 at 25° C. is greater than $10^{13}\Omega$. The third ground conductor 32 is connected to the electrical reference potential of the measuring device 100. As a rule, the electrical reference potential is an electrical voltage of 0V.

According to the two embodiments of FIGS. 1 and 2, the amplifier arrangement 3 comprises an operational amplifier 30 and a feedback capacitance 36. The operational amplifier 30 comprises an inverting input−, a non-inverting input+and an output 38. The third signal conductor 31 is electrically connected to the inverting input−and transmits the measurement signal M to the inverting input−. The feedback capacitance 36 is arranged in parallel with the inverting input−and the output 38 of the operational amplifier 30. The feedback capacitance 36 has the function of an integrator. The measurement signal M consists of polarization charges. To ensure that the polarization charges flow into the feedback capacitance 36 with as little loss as possible, the inverting input−comprises a high-impedance electrical input resistance of $10^{14}\Omega$. The operational amplifier 30 and the feedback capacitance 36 form a charge amplifier, which amplifies the measurement signal M into a measured value V. The capacitance of the feedback capacitance 36 is adjustable. Depending on the capacitance of the feedback capacitance 36, the amplification has a factor of $10^1$, $10^2$, $10^3$, $10^4$, etc. The measured value V is an electrical voltage. The third ground conductor 32 is electrically connected to the non-inverting input+.

The amplifier arrangement 3 of the two embodiments according to FIGS. 1 and 2 may comprise an electrical discharge resistor 37, which is arranged in parallel to the inverting input of the operational amplifier 30 and to the output 38 of the operational amplifier 30. The electrical discharge resistor 37 continuously discharges the feedback capacitance 36 so that it is not overloaded after some time by fault currents, which fault currents in particular occur in quasi-static measurements due to the only finite high-impedance electrical insulation of the signal conductors 11, 21, 31.

According to the two embodiments of FIGS. 3 and 4, the amplifier arrangement 3 comprises an operational amplifier 30. The operational amplifier 30 comprises an inverting input−, a non-inverting input+and an output 38. The third signal conductor 31 is electrically connected to the non-inverting input+and transmits the measurement signal M to the non-inverting input+. The measurement signal M is an electrical voltage. The operational amplifier 30 amplifies the electrical voltage into a measured value V. The measured value V is also an electrical voltage. In order to amplify the electrical voltage with as little loss as possible, no electrical current should flow into the non-inverting input+via the third signal conductor 31. Therefore, the non-inverting input+has a high-impedance electrical input resistance of $10^{14}\Omega$. The operational amplifier 30 amplifies the electrical voltage with adjustable factors of $10^1$, $10^2$, $10^3$, $10^4$, and so on. The third ground conductor 32 is electrically connected to the inverting input−.

The amplifier arrangement 3 comprises an RFID write and read device 33. The RFID write and read device 33 is electrically connected to the third signal conductor 31 and to the third ground conductor 32. The RFID write and read device 33 is connected to an electrical power supply not shown in the figure. The RFID write and read device 33 is configured to write data D to and read data D from the RFID transponder 13 via the signal conductor 11, 21, 31. As schematically shown in FIGS. 2 and 4, the RFID write and read device 33 is designed to write data D into the additional RFID transponder 23 via the signal conductor 11, 21, 31 and to read it from the additional RFID transponder 23.

The RFID write and read device 33 comprises an electrical generator circuit 33' that generates high frequency electrical signals HF. Typically, the frequency of the high frequency electrical signals HF is 13.56 MHz. The electrical generator circuit 33' represents a medium-high impedance load with an electrical insulation resistance at 25° C. of less than $10^{10}\Omega$.

The amplifier arrangement 3 comprises an amplifier coupling capacitance 34 through which the RFID write and read device 33 is capacitively coupled to the third signal conductor 31.

According to the two embodiments of FIGS. 1 and 2, the measurement signal M of the third signal conductor 31 comprises polarization charges. The amplifier coupling capacitance 34 prevents polarization charges from flowing from the high-impedance third signal conductor 31 to the medium-high impedance electrical generator circuit 33'.

According to the two embodiments of FIGS. 3 and 4, the measurement signal M of the third signal conductor 31 comprises an electric voltage. The amplifier coupling capacitance 34 prevents loss of the electrical voltage that otherwise would occur by flowing an electrical current from the high-impedance third signal conductor 31 to the medium-high impedance electrical generator circuit 33'.

The electrical generator circuit 33' is electrically connected to the third signal conductor 31 and feeds the high-frequency electrical signals HF into the third signal conductor 31. According to the two embodiments of FIGS. 1 and 3, the high-frequency electrical signals HF pass from the third signal conductor 31 to the first signal conductor 11 electrically connected to the third signal conductor 31. According to the two embodiments of FIGS. 2 and 4, the high-frequency electrical signals HF pass from the third signal conductor 31 to the second signal conductor 21 electrically connected to the third signal conductor 31 and to the first signal conductor 11 electrically connected to the second signal conductor 21.

As soon as high-frequency electrical signals HF enter the first signal conductor 11, they capacitively couple with the energy storage 13" of the RFID transponder 13 and are stored in the energy storage 13". Thus, the RFID transponder 13 is supplied with electrical energy.

As soon as high-frequency electrical signals HF enter the second signal conductor 21, they capacitively couple with the additional energy storage 23" of the additional RFID transponder 23 and are stored in the additional energy storage 23". Thus, the additional RFID transponder 23 is supplied with electrical energy.

The RFID write and read device 33 comprises an electrical modulation/demodulation circuit 33". The electrical modulation/demodulation circuit 33" is electrically connected to the third signal conductor 31. The modulation/demodulation circuit 33" has the function of entering data D into the third signal conductor 31 and extracting data D from the third signal conductor 31. The electrical modulation/demodulation circuit 33" is designed to modulate data D onto the high-frequency electrical signals HF of the third signal conductor 31. The modulation can be an amplitude modulation or a phase modulation. The modulation is performed according to a data protocol. According to the four embodiments of FIGS. 1 to 4, the high-frequency electrical signals RF transmit the modulated data D from the third signal conductor 31 to the first signal conductor 11. According to the two embodiments of FIGS. 2 and 4, the high-frequency electrical signals RF transmit the modulated data D from the third signal conductor 31 to the second signal conductor 21.

The RFID transponder 13 comprises an electrical demodulation/modulation circuit 13'''. The electrical demodulation/modulation circuit 13''' is electrically connected to the first signal conductor 11. When electrical power is supplied to the RFID transponder 13, the electrical demodulation/modulation circuit 13''' is automatically activated. The activated demodulation/modulation circuit 13''' has the function of extracting data D from the first signal conductor 11 and entering data D into the first signal conductor 11. The activated electrical demodulation/modulation circuit 13''' is configured to extract the modulated data from the high-frequency electrical signals HF in the first signal conductor 11. The demodulation is performed according to the same data protocol as the modulation. The data D can be commands of the RFID write and read device 33, which are to be executed by the RFID transponder 13. The data D can be sensor-specific data SD, which are stored in the data memory 13' by the RFID transponder 13.

The additional RFID transponder 23 comprises an additional electrical demodulation/modulation circuit 23'''. The additional electrical demodulation/modulation circuit 23''' is electrically connected to the second signal conductor 21. When electrical power is supplied to the additional RFID transponder 23, the additional electrical demodulation/modulation circuit 23''' is automatically activated. The activated additional demodulation/modulation circuit 23''' has the function of extracting data D from the second signal conductor 21 and entering data D into the second signal conductor 21. The activated additional electrical demodulation/modulation circuit 23''' is configured to extract the modulated data D from the high-frequency electrical signals HF in the second signal conductor 21. The demodulation is performed according to the same data protocol as the modulation. The data D can be commands of the RFID write and read device 33, which are to be executed by the additional RFID transponder 23. The data D can be cable-specific data KD, which are stored in the additional data memory 23' by the additional RFID transponder 23.

The activated electrical demodulation/modulation circuit 13''' is configured to read out sensor-specific data SD from the data memory 13' for commands. The activated electrical demodulation/modulation circuit 13''' is configured to modulate the read-out sensor-specific data SD onto the high-frequency electrical signals HF of the first signal conductor 11. The modulation can be an amplitude modulation or a phase modulation. The modulation is performed according to the data protocol. According to the four embodiments of FIGS. 1 to 4, the high-frequency electrical signals HF with the modulation transmit the sensor-specific data SD from the first signal conductor 11 to the third signal conductor 31.

The activated additional electrical demodulation/modulation circuit 23''' is configured to read out cable-specific data KD from the data memory 13' for commands. The activated additional electrical demodulation/modulation circuit 23''' is configured to modulate the read-out cable-specific data KD onto the high-frequency electrical signals HF of the second signal conductor 21. The modulation can be an amplitude modulation or a phase modulation. The modulation is performed according to the data protocol. According to the two embodiments of FIGS. 2 and 4, the high-frequency electrical signals HF with the modulation transmit the cable-specific data KD from the second signal conductor 21 to the third signal conductor 31.

The electrical modulation/demodulation circuit 31" is configured to demodulate the modulation of the high-frequency electrical signals RF in the third signal conductor 31. The demodulation is performed according to the same data protocol as the modulation. With the demodulation, the electrical modulation/demodulation circuit 31" extracts the sensor-specific data SD and/or the cable-specific data KD from the high-frequency electrical signals HF.

The RFID write and read device 33 includes at least one data conductor 39. The data conductor 39 is made of electrically conductive material such as copper, gold, etc. On the data conductor 39, the RFID write and read device 33 transmits the sensor-specific data SD and/or the cable-specific data KD.

The Evaluation Arrangement

The evaluation arrangement 4 has the function of evaluating the measured value V. For this purpose, the evaluation arrangement 4 uses both sensor-specific data SD and cable-specific data KD. The evaluation arrangement 4 is schematically shown as a dashed rectangle that envelops the evaluation arrangement 4.

The evaluation arrangement 4 comprises a data acquisition and evaluation unit 40. The data acquisition and evaluation unit 40 may be a computer that includes at least a processor, a data memory 40' and input and output means. The data acquisition and evaluation unit 40 comprises an input 48, at least one additional data conductor 49 and a fourth ground conductor 42. The input 48, the additional data conductor 49 and the fourth ground conductor 42 are made of electrically conductive material such as copper, steel, etc.

The input 48 may be electrically connected to the output 38 of the operational amplifier 30 via a connecting means not shown in the figure, such as a bushing, a plug, the Internet, etc., and the data acquisition and analysis unit 40 receives the measured value V via the input 48.

The fourth ground conductor 42 may be electrically connected to the third ground conductor 32 via a connecting means not shown in the figure, such as a terminal, a plug, the Internet, etc.

The additional data conductor 49 may be electrically connected to the data conductor 39 of the RFID write and read device 33 via a connecting means not shown in the figure, such as a bushing, a plug, the Internet, etc., and the data acquisition and evaluation unit 40 receives sensor-specific data SD and/or cable-specific data KD from the RFID write and read device 33 via the additional data conductor 49.

The data acquisition and evaluation unit 40 thus has the sensor-specific data SD and/or cable-specific data KD at its disposal and is configured to store the sensor-specific data SD and/or cable-specific data KD in the data memory 40'.

LIST OF REFERENCE NUMERALS

1 sensor arrangement
10 PE sensor element
10* DMS circuit unit
10.1 first DMS
10.2 second DMS
10.3 third DMS
10.4 fourth DMS
10.5 DMS voltage supply unit
10.6 first DMS compensation resistor
10.7 second DMS compensation resistor
10' first node
10" second node
10'" third node
10"" fourth node
11 first signal conductor
12 first ground conductor
13 RFID transponder
13' data memory
13" energy storage
13'" electrical demodulation/modulation circuit
14 sensor coupling capacitance
15 sensor housing
2 cable arrangement
21 second signal conductor
22 second ground conductor
23 additional RFID transponder
23' additional data memory
23" additional energy storage
23'" additional electrical demodulation/modulation circuit
24 cable coupling capacitance
25 cable sheath
3 amplifier arrangement
30 operational amplifier
31 third signal conductor
32 third ground conductor
33 RFID write and read device
33' electrical generator circuit
33" electrical modulation/demodulation circuit
34 amplifier coupling capacitance
35 amplifier housing
36 feedback capacitance
37 electrical discharge resistor
38 output
39 data conductor
4 evaluation arrangement
40 data acquisition and evaluation unit
40' data memory
42 fourth ground conductor
48 input
49 additional data conductor
100 measuring device
– inverting input
+ non-inverting input
D data
HF high-frequency electrical signals
KD cable-specific data
M measurement signal
SD sensor-specific data
V measured value

What is claimed is:

1. A measuring device for measuring a physical quantity, the measuring device comprising:

a sensor arrangement configured to generate a measurement signal under the effect of the physical quantity to be measured, wherein the sensor arrangement includes an RFID transponder in which data are permanently stored;

an amplifier arrangement configured to amplify the measurement signal into a measured value, wherein the amplifier arrangement includes an RFID write and read device that is configured to write data to the RFID transponder and read RFID data from the RFID transponder;

at least one signal conductor configured and disposed to transmit the measurement signal to the amplifier arrangement for amplification by the amplifier arrangement to generate the measured value, wherein the at least one signal conductor is configured to transmit data between the RFID transponder and the RFID write and read device of the amplifier arrangement;

a cable arrangement;

wherein the RFID transponder is capacitively coupled to the RFID write and read device via the at least one signal conductor and wherein the RFID write and read device includes an electrical generator circuit;

wherein the electrical generator circuit is configured and disposed to feed high-frequency electrical signals into the at least one signal conductor;

wherein the electrical generator circuit is configured to modulate the data for transmission via the at least one signal conductor onto the high-frequency electrical signals;

wherein the at least one signal conductor includes a first signal conductor which is part of the sensor arrangement and is the at least one signal conductor that is configured and disposed to transmit the measurement signal;

wherein the at least one signal conductor includes a second signal conductor which is part of the cable arrangement and electrically connected to the first signal conductor, wherein the second signal conductor is configured and disposed to transmit the measurement signal; and wherein the cable arrangement includes an additional RFID transponder in which data are permanently stored;

wherein the RFID write and read device is designed to write data to the additional RFID transponder via the at least one signal conductor and to read data from the additional RFID transponder;

wherein the additional RFID transponder is capacitively coupled to the RFID write and read device via the at least one signal conductor;

wherein the electrical generator circuit is configured to modulate the data for transmission between the additional RFID transponder and the RFID write and read device onto the high-frequency electrical signals.

2. The measuring device according to claim 1, wherein the cable arrangement includes a cable coupling capacitance via which the additional RFID transponder is capacitively coupled to the second signal conductor.

3. A measuring device for measuring a physical quantity, the measuring device comprising:

a sensor arrangement configured to generate a measurement signal under the effect of the physical quantity to be measured, wherein the sensor arrangement includes an RFID transponder in which data are permanently stored;

an amplifier arrangement configured to amplify the measurement signal into a measured value, wherein the amplifier arrangement includes an RFID write and read device that is configured to write data to the RFID transponder and read RFID data from the RFID transponder;

at least one signal conductor configured and disposed to transmit the measurement signal to the amplifier arrangement for amplification by the amplifier arrangement to generate the measured value, wherein the at least one signal conductor is configured to transmit data between the RFID transponder and the RFID write and read device of the amplifier arrangement;

wherein the RFID transponder is capacitively coupled to the RFID write and read device via the at least one signal conductor and wherein the RFID write and read device includes an electrical generator circuit;

wherein the electrical generator circuit is configured and disposed to feed high-frequency electrical signals into the at least one signal conductor;

wherein the electrical generator circuit is configured to modulate the data for transmission via the at least one signal conductor onto the high-frequency electrical signals;

wherein the sensor arrangement includes a PE sensor element which is configured to generate a measurement signal in the form of polarization charges under the action of the physical quantity to be measured;

wherein the at least one signal conductor includes a first signal conductor which is a part of the sensor arrangement and which is configured to transmit the measurement signal in the form of polarization charges;

wherein the RFID transponder is electrically connected to the first signal conductor;

wherein the amplifier arrangement includes an operational amplifier and a feedback capacitance, which operational amplifier includes an inverting input and an output, and which feedback capacitance is arranged in parallel with the inverting input and the output;

wherein the at least one signal conductor includes a third signal conductor which is part of the amplifier arrangement and which is electrically connected to the first signal conductor and configured and disposed to transmit the measurement signal in the form of polarization charges to the inverting input.

4. The measuring device according to claim 3, wherein the RFID transponder includes an energy store;

wherein the RFID write and read device includes an electrical generator circuit which is configured to generate high-frequency electrical signals;

wherein the electrical generator circuit is electrically connected to the third signal conductor and configured to feed the high-frequency electrical signals generated by the electrical generator circuit of the RFID write and read device into the third signal conductor, which is electrically connected to the first signal conductor; and wherein the high-frequency electrical signals generated by the electrical generator circuit of the RFID write and read device and fed into the third signal conductor pass from the third signal conductor to the first signal conductor and couple capacitively into the energy store of the RFID transponder.

5. The measuring device according to claim 4, wherein the RFID write and read device includes an electrical modulation/demodulation circuit which is electrically connected to the third signal conductor and configured to modulate data onto the high-frequency electrical signals of the third signal conductor and to transmit the modulated data from the third signal conductor to the first signal conductor;

wherein the RFID transponder includes an electrical demodulation/modulation circuit which is electrically connected to the first signal conductor and configured to extract the modulated data from the high-frequency electrical signals in the first signal conductor, which data are commands of the RFID write and read device which are to be executed by the RFID transponder or which data are sensor-specific data which are stored by the RFID transponder.

6. The measuring device according to claim 5, wherein the activated electrical demodulation/demodulation circuit is configured to modulate sensor-specific data for commands to the high-frequency electrical signals of the first signal conductor and transmit the modulated sensor-specific data from the first signal conductor to the third signal conductor; and wherein the electrical modulation/demodulation circuit is configured to extract the modulated sensor-specific data from the high-frequency electrical signals in the third signal conductor.

7. The measuring device according to claim 6, wherein the RFID write and read device includes an electrical modulation/demodulation circuit which is electrically connected to the third signal conductor;

wherein the electrical modulation/demodulation circuit is configured to modulate data onto the high-frequency electrical signals of the third signal conductor;

wherein the high-frequency electrical signals transmit the modulated data from the third signal conductor to the second signal conductor;

wherein the additional RFID transponder includes an additional electrical demodulation/modulation circuit, which is electrically connected to the second signal conductor and configured to extract the modulated data from the high-frequency electrical signals in the second signal conductor, which data are commands of the RFID write and read device which are to be executed by the additional RFID transponder or which data are cable-specific data which are stored by the additional RFID transponder.

8. The measuring device according to claim 3, wherein the RFID write and read device includes an electrical generator circuit electrically connected to the third signal conductor and configured to generate high-frequency signals and feed the high-frequency electrical signals into the third signal conductor; and wherein the high-frequency electrical signals pass from the third signal conductor to the second signal conductor, which is electrically connected to the third signal conductor, and couple capacitively into an additional energy store of the additional RFID transponder.

9. The measuring device according to claim 8, wherein the activated additional electrical demodulation/modulation circuit is configured to modulate cable-specific data for commands to the high-frequency electrical signals of the second signal conductor;

wherein the high-frequency electrical signals transmit the modulated cable-specific data from the second signal conductor to the third signal conductor; and wherein the electrical modulation/demodulation circuit is configured to extract the modulated cable-specific data from the high-frequency electrical signals in the third signal conductor.

10. A measuring device for measuring a physical quantity, the measuring device comprising:

a sensor arrangement configured to generate a measurement signal under the effect of the physical quantity to be measured, wherein the sensor arrangement includes an RFID transponder in which data are permanently stored;

an amplifier arrangement configured to amplify the measurement signal into a measured value, wherein the amplifier arrangement includes an RFID write and read device that is configured to write data to the RFID transponder and read RFID data from the RFID transponder;

at least one signal conductor configured and disposed to transmit the measurement signal to the amplifier arrangement for amplification by the amplifier arrangement to generate the measured value, wherein the at least one signal conductor is configured to transmit data between the RFID transponder and the RFID write and read device of the amplifier arrangement;

wherein the RFID transponder is capacitively coupled to the RFID write and read device via the at least one signal conductor and wherein the RFID write and read device includes an electrical generator circuit;

wherein the electrical generator circuit is configured and disposed to feed high-frequency electrical signals into the at least one signal conductor;

wherein the electrical generator circuit is configured to modulate the data for transmission via the at least one signal conductor onto the high-frequency electrical signals;

wherein the sensor arrangement includes a DMS (strain gauge) circuit unit that is configured to generate a measurement signal in the form of an electrical voltage under the action of the physical quantity to be measured;

wherein the at least one signal conductor includes a first signal conductor which is a part of the sensor arrangement and which is configured to transmit the measurement signal in the form of the electrical voltage;

wherein the RFID transponder is electrically connected to the first signal conductor;

wherein the amplifier arrangement includes an operational amplifier that includes a non-inverting input;

wherein the at least one signal conductor includes a third signal conductor which is part of the amplifier arrangement and which is electrically connected to the first signal conductor and configured and disposed to transmit the measurement signal in the form of the electrical voltage to the non-inverting input.

* * * * *